(12) United States Patent
Kim et al.

(10) Patent No.: US 12,166,244 B2
(45) Date of Patent: Dec. 10, 2024

(54) POUCH TYPE BATTERY CASE AND APPARATUS FOR MANUFACTURING THE SAME, AND POUCH TYPE SECONDARY BATTERY

(71) Applicant: LG Energy Solution, Ltd., Seoul (KR)

(72) Inventors: Hyun Il Kim, Daejeon (KR); Sung Hyun Kim, Seoul (KR); Woo Yong Lee, Daejeon (KR); Ki Hyun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 340 days.

(21) Appl. No.: 17/642,446

(22) PCT Filed: Sep. 16, 2020

(86) PCT No.: PCT/KR2020/012502
§ 371 (c)(1),
(2) Date: Mar. 11, 2022

(87) PCT Pub. No.: WO2021/054722
PCT Pub. Date: Mar. 25, 2021

(65) Prior Publication Data
US 2022/0344789 A1     Oct. 27, 2022

(30) Foreign Application Priority Data

Sep. 17, 2019  (KR) .................. 10-2019-0114298

(51) Int. Cl.
*H01M 50/56*     (2021.01)
*H01M 10/04*     (2006.01)
(Continued)

(52) U.S. Cl.
CPC ....... *H01M 50/56* (2021.01); *H01M 10/0404* (2013.01); *H01M 50/105* (2021.01); *H01M 50/131* (2021.01); *H01M 50/178* (2021.01)

(58) Field of Classification Search
CPC ........ H01M 10/0525; H01M 10/0404; H01M 10/049; H01M 2220/30; H01M 50/56;
(Continued)

(56) References Cited

U.S. PATENT DOCUMENTS

2007/0224499 A1  9/2007  Kodama et al.
2014/0170474 A1  6/2014  Roh
(Continued)

FOREIGN PATENT DOCUMENTS

CN   101083311 A   12/2007
CN   109964334 A   7/2019
(Continued)

OTHER PUBLICATIONS

International Search Report for Application No. PCT/KR2020/012502 mailed Dec. 18, 2020, 2 pages.
(Continued)

*Primary Examiner* — Jonathan G Leong
*Assistant Examiner* — Kan Luo
(74) *Attorney, Agent, or Firm* — Lerner David LLP

(57) ABSTRACT

A pouch-type secondary battery according to an embodiment of the present invention for solving the above problems includes a cup part configured to accommodate an electrode assembly formed by stacking electrodes and separators, wherein the cup part includes: a bottom portion configured to form a bottom; an outer wall configured to form a side surface and meet the bottom portion; a punch edge configured to connect the bottom portion to the outer wall; a thickness edge configured to connect two adjacent outer walls to each other; and a corner formed by connecting the two adjacent punch edges to the thickness edge, wherein at least one of the punch edges is rounded, at least one of the thickness edge is rounded, at least one of the corner is
(Continued)

rounded and has a curvature radius different from that of each of the punch edge and the thickness edge.

13 Claims, 5 Drawing Sheets

(51) Int. Cl.
    *H01M 50/105*     (2021.01)
    *H01M 50/131*     (2021.01)
    *H01M 50/178*     (2021.01)

(58) Field of Classification Search
    CPC ............. H01M 50/131; H01M 50/178; H01M 50/105; B29C 51/00–08; B29L 2031/7146; Y02E 60/10; Y02P 70/50
    See application file for complete search history.

(56) References Cited

U.S. PATENT DOCUMENTS

| | | |
|---|---|---|
| 2014/0227573 A1 | 8/2014 | Kwon |
| 2017/0373286 A1 | 12/2017 | Kim et al. |
| 2020/0122383 A1 | 4/2020 | Egashira |

FOREIGN PATENT DOCUMENTS

| | | |
|---|---|---|
| JP | H08155552 A | 6/1996 |
| JP | 2002075299 A | 3/2002 |
| JP | 2002208384 A | 7/2002 |
| JP | 2002260600 A | 9/2002 |
| JP | 2004039271 A | 2/2004 |
| JP | 2005294212 A | 10/2005 |
| JP | 2007257847 A | 10/2007 |
| JP | 2013154389 A | 8/2013 |
| JP | 2014-120470 A | 6/2014 |
| JP | 2014175247 A | 9/2014 |
| JP | 2016502238 A | 1/2016 |
| JP | 2018006326 A | 1/2018 |
| JP | 2018085190 A | 5/2018 |
| JP | 2018103572 A | 7/2018 |
| JP | 2018137112 A | 8/2018 |
| KR | 20070109080 A | 11/2007 |
| KR | 20140131714 A | 11/2014 |
| KR | 20170091938 A | 8/2017 |
| KR | 20180001230 A | 1/2018 |
| KR | 20180092174 A | 8/2018 |
| WO | 2018097054 A1 | 5/2018 |

OTHER PUBLICATIONS

Extended European Search Report for Application No. 20865021.8 dated Aug. 11, 2022. 6 pgs.

POUCH TYPE BATTERY CASE AND APPARATUS FOR MANUFACTURING THE SAME, AND POUCH TYPE SECONDARY BATTERY

CROSS-REFERENCE TO RELATED APPLICATION

The present application is a national stage entry under 35 U.S.C. § 371 of International Patent Application No. PCT/KR2020/012502, filed on Sep. 16, 2020, published in Korean, which claims priority from Korean Patent Application No. 10-2019-0114298, filed on Sep. 17, 2019, the disclosures of which are hereby incorporated herein by reference in their entireties.

TECHNICAL FIELD

The present invention relates to a pouch-type battery case, an apparatus for manufacturing the same, and a pouch-type secondary battery, and more particularly, to a pouch-type battery case, which is improved in durability and is capable of preventing cracks and whitening from occurring during molding and an apparatus for manufacturing the same, and a pouch-type secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the lithium secondary battery, first, electrode active material slurry is applied to a positive electrode collector and a negative electrode collector to manufacture a positive electrode and a negative electrode. Then, the electrodes are stacked on both sides of a separator form an electrode assembly. Also, the electrode assembly is accommodated in a battery case, and then the battery case is sealed after an electrolyte is injected therein.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

A pouch, which is a case of the pouch-type secondary battery, is manufactured by forming a cup part by performing press processing on a pouch film having flexibility. In addition, when the cup part is formed, an electrode assembly is accommodated in an accommodation space of the cup part, and then, a side of the cup part is sealed to manufacture a secondary battery.

In the press processing, drawing molding is performed by inserting a pouch film into a molding device such as a press equipment and applying a pressure to the pouch film by using a punch to elongate the pouch film. However, since the pouch film is provided in the form of a film or sheet having a significant thin thickness, stress has been concentrated to edges and corners when the pouch film is elongated. Therefore, there is a problem in that cracks occur in the pouch film, or a whitening occurs.

DISCLOSURE OF THE INVENTION

Technical Problem

An object of the present invention for solving the above problems is to provide a pouch-type secondary battery that is capable of preventing cracks and whitening from occurring during molding and apparatus for manufacturing the same, and a pouch-type secondary battery.

The objects of the present invention are not limited to the aforementioned object, but other objects not described herein will be clearly understood by those skilled in the art from descriptions below.

Technical Solution

A pouch-type secondary battery according to an embodiment of the present invention for solving the above problems includes a cup part configured to accommodate an electrode assembly formed by stacking electrodes and separators, wherein the cup part includes: a bottom portion configured to form a bottom; an outer wall configured to form a side surface and meet the bottom portion; a punch edge configured to connect the bottom portion to the outer wall; a thickness edge configured to connect two adjacent outer walls to each other; and a corner formed by connecting the two adjacent punch edges to the thickness edge, wherein at least one of the punch edges is rounded, at least one of the thickness edge is rounded, at least one of the corner is rounded and has a curvature radius different from that of each of the punch edge and the thickness edge.

In addition, the corner may have a curvature radius greater than or equal to that of at least one of the punch edge or the thickness edge.

In addition, the corner may have a variable curvature radius therein.

In addition, a curvature radius of a central portion of the corner may be greater than that of a peripheral portion of the corner.

In addition, the punch edge may have a curvature radius of 2 mm or less.

In addition, the thickness edge may have a curvature radius of 0.5 mm to 5 mm.

In addition, the thickness edge may have a curvature radius greater than or equal to that of the punch edge.

In addition, the corner may be formed within a predetermined range in a length direction and a width direction of the cup part from the thickness edge and a thickness direction of the cup part from the punch edge.

In addition, a range in which the corner is formed may be wider as a depth of the cup part increases.

In addition, a circumference of the corner, which connects the two adjacent punch edges to each other, of an entire circumference of the corner may be formed in a curved shape.

In addition, a circumference of the corner, which connects the punch edge to the thickness edge, of an entire circumference of the corner may be formed in a curved shape.

In addition, a circumference of the corner, which connects the two adjacent punch edges to each other, of an entire circumference of the corner may include at least one straight line.

In addition, a circumference of the corner, which connects the punch edge to the thickness edge, of an entire circumference of the corner may include at least one straight line.

An apparatus for manufacturing a pouch-type secondary battery according to an embodiment of the present invention for solving the above problems includes: a punch configured to press a pouch film so as to form a cup part having a recessed shape in a pouch-type battery case, wherein the punch includes: a pressing bottom portion configured to form a bottom; a pressing outer wall configured to form a side surface and meet the bottom portion of the pressing bottom portion; a pressing edge configured to connect the pressing bottom portion and the pressing outer wall to each other; a pressing thickness portion configured to connect two adjacent pressing outer walls to each other; and a pressing corner formed by connecting two adjacent pressing edges to the pressing thickness portion, wherein at least one of the pressing corners is rounded and has a curvature radius different from that of each of the pressing edge and the pressing thickness portion.

The present invention provides a secondary battery including the pouch-type battery case.

Particularities of other embodiments are included in the detailed description and drawings.

Advantageous Effects

According to the embodiments of the present invention, there are at least the following effects.

When the pouch film is molded to manufacture the battery case, at least one corner of the cup part may be rounded to improve the durability of the battery case and prevent the cracks and the whitening from occurring during the molding of the pouch film.

The effects of the prevent invention are not limited by the aforementioned description, and thus, more varied effects are involved in this specification.

MODE FOR CARRYING OUT THE INVENTION

Figure 1:
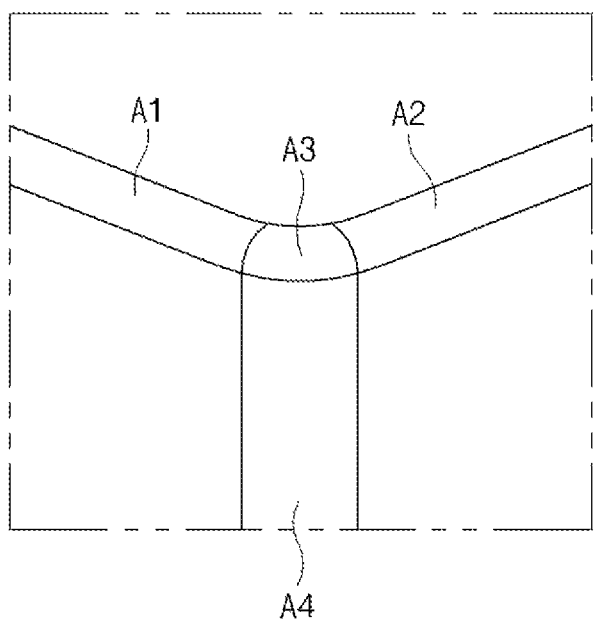
FIG. 1 is an enlarged perspective view illustrating an edge formed on a cup part formed in a battery case and a periphery of the cup part according to a related art.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Pouch Type Battery Case

FIG. 1 is an enlarged perspective view illustrating an edge formed on a cup part formed in a battery case and a periphery of the cup part according to a related art.

Conventionally, a rounding treatment has been performed on a plurality of edges of a punch at the same curvature radius. Thus, the rounding treatment has been performed at a corner of the punch at the same curvature radius. As a result, when a pouch film is molded and then elongated using the punch, corners of the pouch film has been rounded at the same curvature radius as the edge of the punch.

Thus, as illustrated in FIG. 1, in a cup part formed in a pouch-type battery case according to the related art, a curvature radius of a first punch edge A1, a curvature radius of a second punch edge A2, and a curvature radius of a first corner A3 connecting the first punch edge A1 to the second punch edge A2 may be the same.

However, when the pouch film is elongated, there is a problem that stress is concentrated, and a thickness of the pouch film becomes thin. In particular, since the corner is formed by meeting three edges, that is, two punch edges and one thickness edge, the corner may be more elongated than the punch edges or the thickness edge, and thus, stress may be more concentrated to the corner than the punch edges or the thickness edge. In FIG. 1, when directions in which the first punch edge A1 and the second punch edge A2 extend respectively refer to a first vector and a second vector, and a direction in which the first thickness edge A4 refers to a third vector, elongation may occur in a direction in which the sum vector of the first vector, the second vector, and the third vector is oriented.

As a result, as illustrated in FIG. 1, since the pouch film is excessively elongated, durability may decrease in an area corresponding to the corner, and a whitening phenomenon in which a specific portion is changed to a white color may occur immediately before cracking. Therefore, the cracks may easily occur.

Here, the occurrence of the cracks is determined based on a residual rate of an aluminum alloy contained in the pouch film. If the residual rate is 60% or more, it is determined as good products, and if the residual rate is less than 60%, it is determined as defective. The residual ratio refers to a ratio of a residual amount after the molding to a residual amount before the molding of the aluminum alloy at a specific point of the pouch film. In fact, in the case in which the residual rate is less than 60%, when the cup part 100 is drawn and molded on the pouch film, a frequency of occurrence of the cracks at a specific point is high, but when the residual rate is more than 60%, the cracks do not occur. Therefore, hereinafter, that the cracks easily occur means that the residual rate is relatively low, and the frequency of occurrence of the cracks is high.

Figure 2:
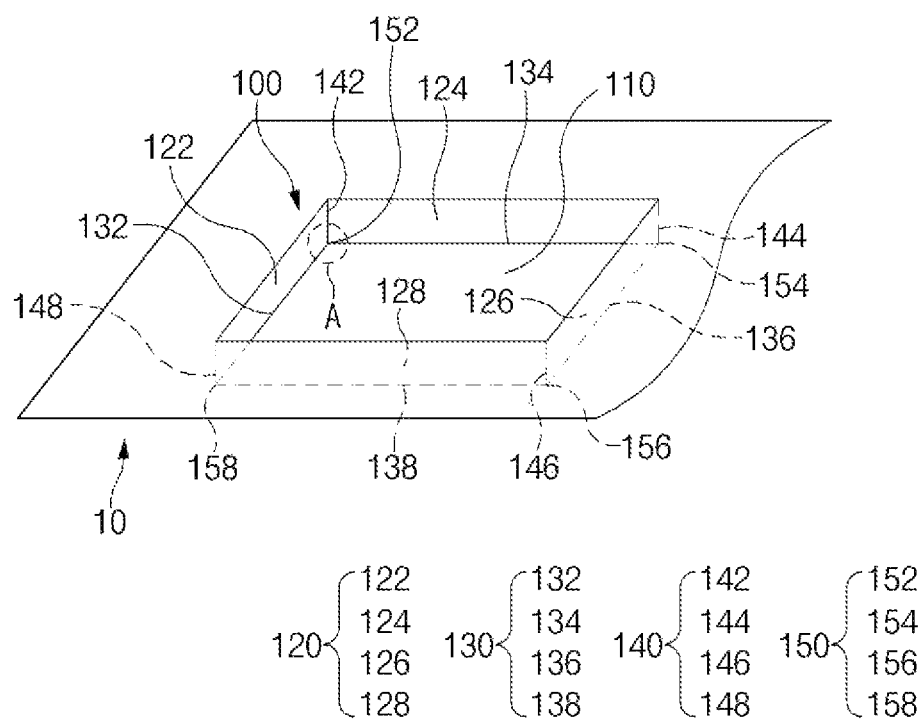
FIG. 2 is a perspective view of a cup part 100 formed in a pouch-type battery case 10 according to the present invention.

FIG. 2 is a perspective view of a cup part 100 formed in a pouch-type battery case 10 according to the present invention.

The present invention may be an invention for solving the above problems according to the related art. That is, according to the present invention, when manufacturing the battery case 10 by molding a pouch film, at least one corner 150 of the cup part 100 may be rounded to improve durability of the battery case 10, and when molding the pouch film, cracks and whitening may be prevented from occurring.

For this, a pouch-type battery case 10 according to an embodiment of the present invention includes a cup part 100 configured to accommodate an electrode assembly formed by stacking electrodes and separators therein. Here, the cup part 100 includes: a bottom portion 110 configured to form a bottom; an outer wall 120 configured to form a side surface and meet the bottom portion 110; a punch edge 130 configured to connect the bottom portion 110 to the outer wall 120; a thickness edge 140 configured to connect two adjacent outer walls 120 to each other; and a corner 150 formed by connecting the two adjacent punch edges 130 to the thickness edge 140, wherein at least one of the corners 150 is rounded and has a curvature radius that is different from that of each of the punch edge 130 and the thickness edge 140.

As illustrated in FIG. 2, the pouch-type battery case 10 is manufactured by drawing and molding the pouch film in the form of a film or sheet. The pouch film may have a structure in which a plurality of layers made of different materials are stacked.

As illustrated in FIG. 2, the battery case 10 may include the cup part 100 having a shape that is recessed downward. The cup part 100 may be a space in which an electrode assembly (not shown) including an electrode and a separator is accommodated. FIG. 2 illustrates a state in which one cup part 100 is formed in the battery case 10. However, unlike this structure, a plurality of cup parts 100 may be formed in the battery case 10, and the electrode assembly may be accommodated in an empty space formed by the plurality of cup parts 100.

The cup part 100 may include a bottom portion 110 forming a bottom and an outer wall 120 forming a side surface of the cup part 100 and meeting the bottom portion 110. As illustrated in FIG. 1, a circumference of the bottom portion 110 may have a rectangular shape, and the outer wall 120 may be formed to meet each of edges forming the circumference of the bottom portion 110. Here, the fact that the circumference of the bottom portion 110 has the rectangular shape does not mean only a case in which the circumference of the bottom portion 110 has the rectangular shape in a geometric sense as well as a case in which the circumference of the bottom portion 110 has an approximately rectangular shape at a glance.

As illustrated in FIG. 2, when the circumference of the bottom portion 110 has the rectangular shape, the outer wall 120 may include a first outer wall 122, a second outer wall 124, a third outer wall 126, and a fourth outer wall 128.

The cup part 100 includes various types of edges. Particularly, the cup part 100 includes a punch edge 130 formed to correspond to a pressing edge of a punch 26 (see FIG. 5). The punch edge 130 may connect the bottom portion 110 to the outer wall 120 of the cup part 100 to form a boundary between the bottom portion 110 and the outer wall 120. As illustrated in FIG. 2, a first punch edge 132 may be formed on an area at which the bottom portion 110 and the first outer wall 122 meet each other, and a second punch edge 134 may be formed on an area at which the bottom portion 110 and the second outer wall 124 meet each other. In addition, a third punch edge 136 may be formed on an area at which the bottom portion 110 and the third outer wall 126 meet each other, and a fourth punch edge 138 may be formed on an area at which the bottom portion 110 and the fourth outer wall 128 meet each other.

If rounding treatment is not performed on the pressing edge of the punch 26, the pressing edge of the punch 26 is sharped. As a result, when the pouch film is formed, stress is concentrated to the punch edge 130 of the cup part 100 to easily cause cracks. Thus, according to an embodiment of the present invention, the rounding treatment may be performed on the pressing edge of the punch 26 so that at least one of the punch edges 130 of the cup part 100 is rounded to protrude convexly. As a result, it is possible to disperse the stress concentrated to the punch edge 130 of the cup part 100. Here, a curvature radius of the punch edge 130 may be defined as a curvature radius around a cross-section when the punch edge 130 is cut in a direction perpendicular to a direction in which the punch edge 130 extends. The punch edge 130 may have a curvature radius of 2 mm or less, particularly 0.7 mm or less.

The punch edges 130 adjacent to each other may vertically meet each other. That is, as illustrated in FIG. 2, the first punch edge 132 and the second punch edge 134, the second punch edge 134 and the third punch edge 136, and the third punch edge 136 and the fourth punch edge 138, the fourth punch edge 138 and the first punch edge 132 may vertically meet each other.

Also, the cup part 100 may include a thickness edge 140 connecting two adjacent outer walls 120 to each other. This thickness edge 140 is formed in a thickness direction of the cup part 100 and also is formed while being elongated between a corner of a die 22 (see FIG. 5) and the pressing corner of the punch 26 when the pouch film is elongated. As illustrated in FIG. 2, a first thickness edge 142 may be formed on an area at which the first outer wall 122 and the second outer wall 124 meet each other, and a second thickness edge 144 may be formed on an area at which the second outer wall 124 and the third outer wall 126 meet each other. In addition, a third thickness edge 146 may be formed on an area at which the third outer wall 126 and the fourth outer wall 128 meet each other, and a fourth thickness edge 148 may be formed on an area at which the fourth outer wall 128 and the first outer wall 122 meet each other. Each of the first to fourth thickness edges 142, 144, 146, and 148 may have a thickness corresponding to a depth of the cup part 100. More preferably, the length of each of the first to fourth thickness edges 142, 144, 146, and 148 may be a value obtained by subtracting a width of the punch edge 130 from the depth of the cup part 100. The lengths of the first to fourth thickness edges 142, 144, 146, and 148 may be the same, but if the cup part 100 is formed asymmetrically, the lengths may be different from each other.

According to an embodiment of the present invention, the thickness edge 140 of the cup part 100 may also be rounded to protrude convexly outward. As a result, it is possible to disperse the stress concentrated to the thickness edge 140 of the cup part 100. Here, a curvature radius of the thickness edge 140 may be defined as a curvature radius around a cross-section when the thickness edge 140 is cut in a direction perpendicular to a direction in which the thickness edge 140 extends.

In addition, according to an embodiment of the present invention, the thickness edge 140 may have a curvature radius different from that of each of two adjacent punch edges 130. The thickness edge 140 may have a curvature radius of 0.5 mm to 5 mm, particularly 0.5 mm to 3 mm, and the thickness edge 140 may have a curvature radius greater than or equal to the curvature radius of the punch edge 130.

Figure 3:
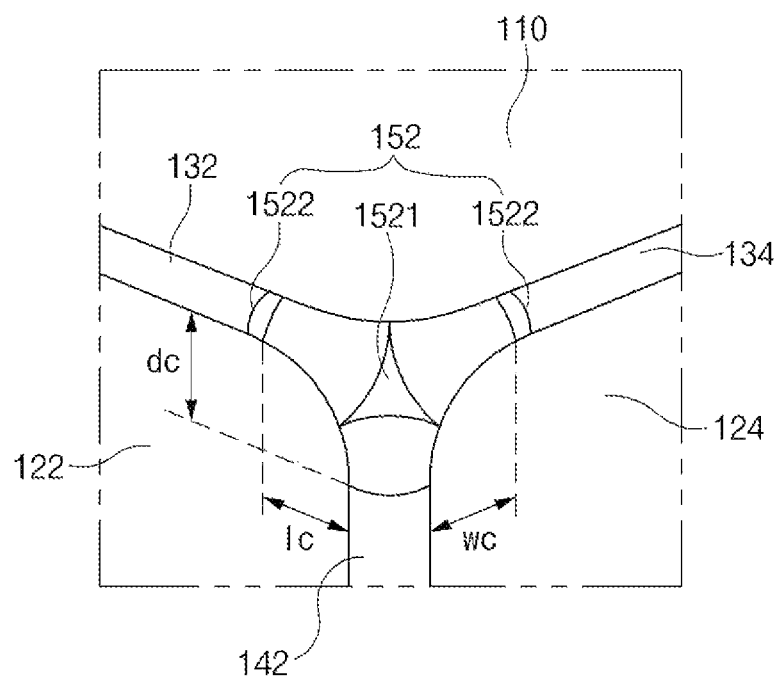
FIG. 3 is an enlarged perspective view of a corner 150 formed on the cup part 100 formed in the battery case 10 according to an embodiment of the present invention.

FIG. 3 is an enlarged perspective view of a corner 150 formed on the cup part 100 formed in the battery case 10 according to an embodiment of the present invention.

Unlike FIG. 2, in FIG. 3, the cup part 100 is illustrated as having a shape protruding toward the ground. This is for convenience of explanation and understanding. That is, FIG. 3 is an enlarged view illustrating a configuration when the first corner 152 of FIG. 2 and surroundings of the first corner are viewed from a low side of the battery case 10.

As illustrated in FIG. 3, the cup part 100 may include a corner 150 formed by connecting two adjacent punch edges 130 to thickness edges 140. That is, a first corner 152 may be formed on an area at which the first punch edge 132, the second punch edge 134, and the first thickness edge 142 meet each other, and a second corner 154 may be formed on an area at which the second punch edge 134, the third punch edge 136, and the second thickness edge 144 meet each other. In addition, a third corner 156 may be formed on an area at which the third punch edge 136, the fourth punch edge 138, and the third thickness edge 146 meet each other, and a fourth corner 158 may be formed on an area at which the fourth punch edge 138, the first punch edge 132, and the fourth thickness edge 148 meet each other. And, as illustrated in FIG. 3, each of the first punch edge 132, the second punch edge 134, the first thickness edge 142, and the first corner 152 may not have a concavely recessed area.

As described above, if the rounding treatment is not performed on the pressing corner of the punch 26, the pressing corner of the punch 26 is sharped. As a result, when the pouch film is formed, stress is concentrated to the corner 150 of the cup part 100 to easily cause cracks. Thus, according to an embodiment of the present invention, the rounding treatment may be performed on the pressing corner of the punch 26 so that at least one corner 150 of the cup part 100 is rounded to protrude convexly. Here, a curvature radius of the corner 150 may be different from a curvature radius of at least one of the punch edge 130 and the thickness edge 140. Particularly, a curvature radius of the corner 150 may be different from a curvature radius of at least one of the punch edge 130 and the thickness edge 140. For example, as illustrated in FIG. 3, the curvature radius of the first corner 152 may be greater than that of at least one of the first punch edge 132, the second punch edge 134, and the first thickness edge 142. As a result, it is possible to disperse the stress concentrated to the corner 150 of the cup part 100.

Furthermore, according to an embodiment of the present invention, the curvature radius may vary inside the corner 150. That is, a curvature radius of a central portion of the corner 150 and a curvature radius of a peripheral portion of the corner 150 may be different from each other. In particular, the curvature radius of the central portion of the corner 150 may be greater than the curvature radius of the peripheral portion of the corner 150. For example, as illustrated in FIG. 3, the curvature radius of the peripheral portion 1522 of the first corner 152 may be the same as that of at least one of the first punch edge 132, the second punch edge 134, or the first thickness edge 142 because of being relatively adjacent to the first punch edge 132, the second punch edge 134, and the first thickness edge 142. On the other hand, the curvature radius of the central portion 1521 of the first corner 150 may be greater than that of at least one of the first punch edge 132, the second punch edge 134, or the first thickness edge 142 because of being relatively spaced apart from the first punch edge 132, the second punch edge 134, and the first thickness edge 142.

Accordingly, a curvature radius of the corner 150 may be different from a curvature radius of at least one of the punch edge 130 and the thickness edge 140. In addition, the curvature radius of the corner 150 may gradually increase from the peripheral portion of the corner 150 to the central portion of the corner 150. In addition, as described above, since the curvature radius inside the corner 150 is not constant but varies, the central portion of the corner 150 may have an aspherical shape, but not an accurate spherical surface.

Unlike the punch edge 130, the corner 150 has to be clearly set not only the curvature radius but also a range to be formed in the cup part 100. If the range in which the corner 150 is formed in the cup part 100 is excessively narrow, the pouch film is still excessively elongated to cause the whitening or the cracking. On the other hand, if the range in which the corner 150 is formed in the cup part 100 is excessively wide, a space 17 between the outer wall 120 of the cup part 100 and the electrode assembly 10 decreases, and thus, the secondary battery 1 may increase in energy density relative to a volume thereof. Particularly, according to an embodiment of the present invention, as illustrated in FIG. 3, the corner 150 may be formed within a predetermined range in a length direction 1c and a width direction wc of the cup part 100 from the thickness edge 140 and a thickness direction dc of the cup part 100 from the punch edge 130. In addition, the range in which the corner 150 is formed may be wider as the depth of the cup part 100 increases. Since the corner 150 of the cup part 100 is formed as described above, the stress that is more concentrated to the corner 150 may be dispersed to prevent the whitening and the cracking.

Meanwhile, as illustrated in FIG. 3, according to an embodiment of the present invention, a circumference of the corner 150, which connects two adjacent punch edges 130 to each other, of the entire circumference of the corner 150 may be formed in a curved shape. In addition, a circumference of the corner 150, which connects the punch edge 130 to the thickness edge 140, on the entire circumferences of the corner 150 may also be formed in a curved shape. In this case, since utilization of the inner space of the battery case 10 may increase, capacity per unit volume of the secondary battery to which the battery case 10 is applied may increase.

Figure 4:
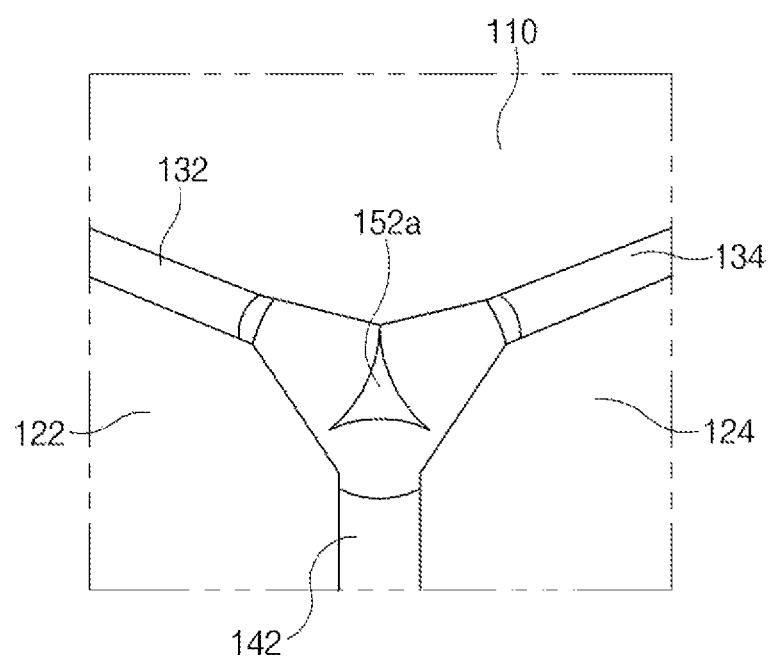
FIG. 4 is an enlarged perspective view of a corner 150 formed on a cup part 100 formed in a battery case 10 according to another embodiment of the present invention.

FIG. 4 is an enlarged perspective view of a corner 150 formed on a cup part 100 formed in a battery case 10 according to another embodiment of the present invention.

As illustrated in FIG. 4, according to another embodiment of the present invention, a circumference of a corner 150, which connects two adjacent punch edges 130 to each other, of the entire circumference of the corner 150 may include at least one straight line. In addition, a circumference of the corner 150, which connects the punch edge 130 to a thickness edge 140, on the entire circumferences of the corner 150 may also include at least one straight line. In this case, there may be an advantage in terms of simplification of a process for manufacturing the battery case 10.

With reference to FIGS. 3 and 4, the above description of the first punch edge 132 and the second punch edge 134 may be equally applied to a third punch edge 136 and a fourth punch edge 138, and contents of the first thickness edge 142 may be equally applied to second to fourth thickness edges 144, 146, and 148. In addition, the contents of the first corner 152 may be equally applied to second to fourth corners 154, 156, and 158.

Secondary Battery

The secondary battery according to the present invention may include an electrode assembly having a structure, in which electrodes and separators are alternately disposed, and a battery case 10 configured to accommodate the secondary battery. Here, the fact that the electrode assembly has a structure in which the electrodes and the separators are alternately disposed means that the electrode assembly has a structure in which the electrodes and the separators are alternately disposed when the electrode assembly is cut vertically, and thus, a method for manufacturing the electrode assembly is not limited thereto.

The contents of the battery case 10 are replaced with the above-described contents with reference to the drawings.

Apparatus for Manufacturing Battery Case

Figure 5:
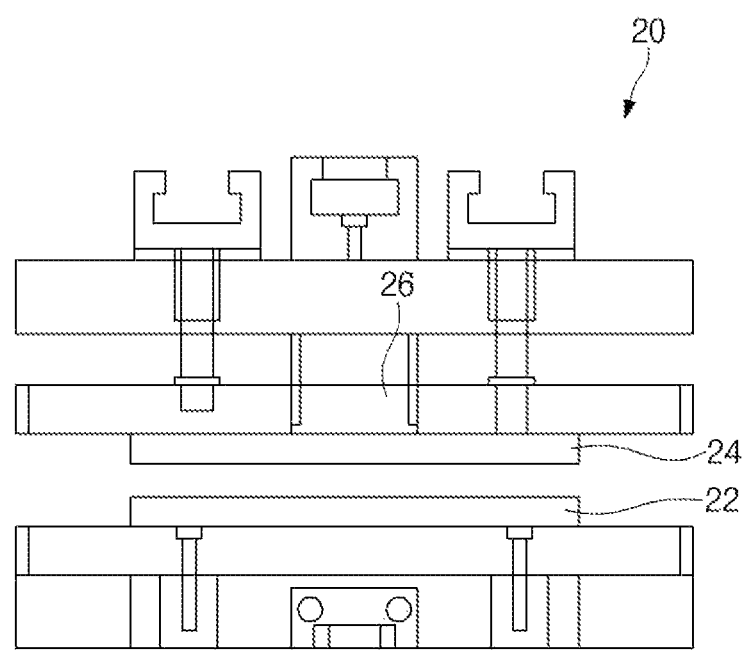
FIG. 5 is a vertical cross-sectional view illustrating a structure of an apparatus 20 for manufacturing a battery case according to the present invention.

FIG. 5 is a vertical cross-sectional view illustrating a structure of an apparatus 20 for manufacturing a battery case according to the present invention.

The apparatus 20 for manufacturing the battery case according to an embodiment of the present invention includes a punch 26 configured to press a pouch film so as to form a cup part 100 having a recessed shape in a pouch-type battery case. The punch 26 includes: a pressing bottom portion configured to form a bottom; a pressing outer wall configured to form a side surface and meet the bottom portion of the pressing bottom portion; a pressing edge configured to connect the pressing bottom portion and the pressing outer wall to each other; a pressing thickness portion configured to connect two adjacent pressing outer walls to each other; and a pressing corner formed by connecting two adjacent pressing edges to the pressing thickness portion, wherein at least one of the pressing corners is rounded and has a curvature radius different from that of each of the pressing edge and the pressing thickness portion.

As illustrated in FIG. 5, the apparatus 20 for manufacturing the battery case according to the present invention may include a die 22 and a stripper 24. The die 22 and the stripper 24 may be configured to fix the pouch film in a process of forming the cup part 100 in a pouch film (not shown). That is, in order to form the cup part 100 in the pouch film, other areas except for the pressed area of the pouch film may need to be fixed. The die 22 and the stripper 24 may be configured to respectively press bottom and top surfaces of the pouch film so as to fix the pouch film.

In addition, the apparatus 20 for manufacturing the battery case according to the present invention may further include a punch 26 configured to press the pouch film so as to form the cup part 100 having a shape recessed in the battery case 10. The punch 26 may be accommodated in a through-hole formed in a central area of the upper fixing part 24.

The area in which the cup part 100 is formed in the battery case 10 by pressing the pouch film through the punch 26 may have a shape corresponding to the shapes of the bottom portion 110, the outer wall 120, the punch edge 130, the thickness edge 140, and the corner 150, which are formed in the cup part 100 (see FIG. 1) of the above-described battery case 10. Thus, the area in which the cup part 100 is formed in the battery case 10 by pressing the pouch film through the punch 26 may have the same shape as the bottom portion 110, the outer wall 120, the punch edge 130, the thickness edge 140, and the corner 150, which are formed in the cup part 100 of the above-described battery case.

The punch 26 may include a pressing bottom portion configured to meet the bottom portion 110 of the cup part 100 and form a bottom of the punch 26 and a pressing outer wall configured to meet the outer wall 120 of the cup part 100 and form a side surface of the punch 26. The pressing bottom portion and the pressing outer wall of the punch 26 may be configured to press the bottom portion 110 (see FIG. 1) and the outer wall 120 (see FIG. 1) of the cup part 100 of the battery case 10 described above and may have a shape corresponding to the shapes of the bottom portion 110 and the outer wall 120 of the cup part 100.

The pressing outer wall may include a plurality of pressing outer walls. The above-described first to fourth pressing outer walls may have shapes corresponding to those of the first to fourth outer walls 122, 124, 126, and 128 (see FIG. 1) of the cup part 100 described above, respectively.

The punch 26 may include a pressing edge connecting the pressing bottom portion to the pressing outer wall. The pressing edge may have a shape corresponding to that of the punch edge 130 (see FIG. 1) of the cup part 100 described above. That is, the first to fourth pressing edges having shapes, which respectively correspond to those of the first to fourth punch edges 132, 134, 136, and 138 (see FIG. 1) of the cup part 100 may be formed on the areas on which the pressing bottom portion and the first to fourth pressing outer walls meet each other, respectively. Accordingly, at least one of the pressing edges may convexly protrude outward to be rounded.

Also, the punch 26 may include a pressing thickness portion connecting two adjacent pressing outer walls to each other. The pressing thickness portion may have a shape corresponding to that of the thickness edge 140 (see FIG. 1) of the cup part 100 described above. That is, the first to fourth pressing thickness portions may have shapes corresponding to those of the first to fourth thickness edges 142, 144, 146, and 148 (see FIG. 1) of the cup part 100, respectively. Accordingly, at least one of the pressing thickness portions may convexly protrude outward to be rounded.

Also, the punch 26 may include a pressing corner formed by connecting two adjacent pressing edges to the pressing thickness portion. The pressing corner may have a shape corresponding to that of the corner 150 of the cup part 100 described above. That is, the first to fourth pressing corners may have shapes corresponding to those of the first to fourth corners 152, 154, 156, and 158 (see FIG. 1) of the cup part 100, respectively. Accordingly, at least one of the pressing corners may convexly protrude outward to be rounded.

Each of the pressing edge, the pressing thickness, and the pressing corner may have a predetermined curvature radius and convexly protrudes outward to be rounded. In addition, a curvature radius of the pressing edge may correspond to the curvature radius of the punch edge 130 of the cup part 100 described above, a curvature radius of the pressing thickness portion may correspond to the curvature radius of the thickness edge 140 of the cup part 100 described above, and a curvature radius of the pressing corner may correspond to the curvature radius of the corner 150 of the cup part 100 described above.

According to an embodiment of the present invention, since the curvature radius of the thickness edge 140 is different from the curvature radius of the punch edge 130 and is greater than that the curvature radius of the punch edge 130, the curvature radius of the pressing thickness portion may be different from the curvature radius of the pressing edge and be greater than the curvature radius of the pressing edge.

In addition, the corner 150 may have a curvature radius different from at least one of the curvature radius of the punch edge 130 or the curvature radius of the thickness edge 140. Particularly, the curvature radius of the corner 150 may be greater than or equal to at least one of the curvature radius of the punch edge 130 or the curvature radius of the thickness edge 140. Therefore, the pressing corner may have a curvature radius different from the curvature radius of at least one of the pressing edge or the pressing thickness part, and in particular, may be greater than or equal to the curvature radius of at least one of the pressing edge or the pressing thickness part.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch-type secondary battery case comprising a cup part configured to accommodate therein an electrode assembly having stacked electrodes and separators,
    wherein the cup part comprises a bottom portion, two adjacent outer walls that each meet the bottom portion, two adjacent punch edges that respectively connect the bottom portion to the two adjacent outer walls, a thickness edge that connects the two adjacent outer walls to each other, and a corner connecting the two adjacent punch edges to the thickness edge,
    wherein at least one of the two adjacent punch edges is rounded, the thickness edge is rounded, and the corner is rounded, and the corner has a curvature radius different from a curvature radius of each of the two adjacent punch edges and from a curvature radius of the thickness edge,
    wherein the corner has a curvature radius that is variable and greater than the curvature radius of at least one of the two adjacent punch edges or the curvature radius of the thickness edge, and
    wherein an apex of the corner has an aspherical shape.

2. The pouch-type secondary battery case of claim 1, wherein a curvature radius of the apex of the corner is greater than a curvature radius of a peripheral portion of the corner.

3. The pouch-type secondary battery case of claim 1, wherein each of the two adjacent punch edges has a curvature radius of 2 mm or less.

4. The pouch-type secondary battery case of claim 1, wherein the thickness edge has a curvature radius of 0.5 mm to 5 mm.

5. The pouch-type secondary battery case of claim 1, wherein the thickness edge has a curvature radius greater than or equal to a curvature radius of each of the punch edges.

6. The pouch-type secondary battery case of claim 1, wherein the corner is disposed within a predetermined range of distance in a length direction and a width direction of the cup part from the thickness edge and within a predetermined range of distance in a thickness direction of the cup part from each of the two adjacent punch edges.

7. The pouch-type secondary battery case of claim 6, wherein the predetermined ranges of distance in which the corner is disposed is wider as a depth of the cup part increases.

8. The pouch-type secondary battery case of claim 1, wherein a circumference of the corner in a plane that includes the two adjacent punch edges has a curved shape.

9. The pouch-type secondary battery case of claim 1, wherein a circumference of the corner in a plane that includes one of the two adjacent punch edges and the thickness edge has a curved shape.

10. The pouch-type secondary battery case of claim 1, wherein a circumference of the corner in a plane that includes the two adjacent punch edges has at least one straight line.

11. The pouch-type secondary battery case of claim 1, wherein a circumference of the corner in a plane that includes one of the two adjacent punch edges and the thickness edge has at least one straight line.

12. An apparatus for manufacturing a pouch-type secondary battery case, the apparatus comprising:
    a punch configured to press a pouch film so as to form a cup part having a recessed shape in the pouch-type secondary battery case,
    wherein the punch comprises a pressing bottom portion, two adjacent pressing outer walls that each meet the pressing bottom portion, two adjacent pressing edges that respectively connect the pressing bottom portion to the two adjacent pressing outer walls, a pressing thickness portion that connects the two adjacent pressing outer walls to each other, and a pressing corner connecting the two adjacent pressing edges to the pressing thickness portion,
    wherein the pressing corner is rounded and has a curvature radius that is variable and different from a curvature radius of each of the two adjacent pressing edges and from a curvature radius of the pressing thickness portion, and
    wherein an apex of the pressing corner has an aspherical shape.

13. A secondary battery comprising the pouch-type secondary battery case of claim 1.

* * * * *